Nov. 8, 1966  R. C. McDONALD  3,284,608
CLEANER DEVICE FOR WELDING NOZZLE
Filed Sept. 29, 1965
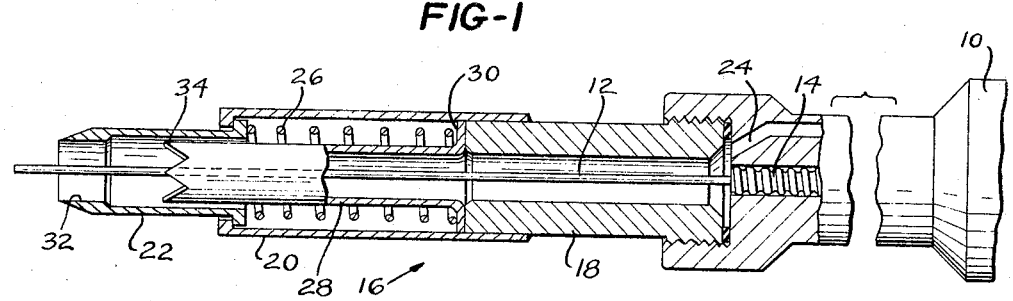
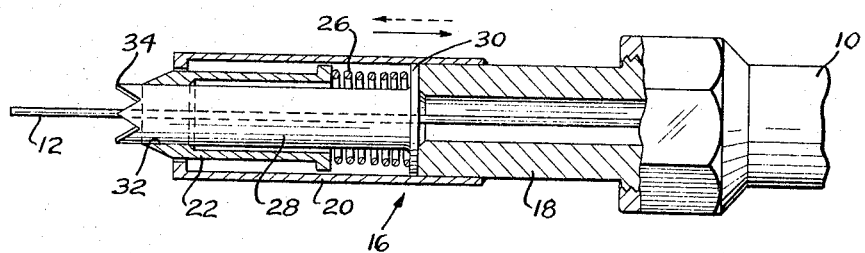
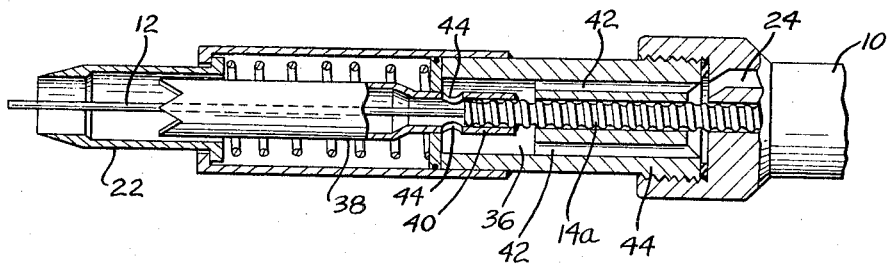
INVENTOR.
RALPH C. McDONALD
BY

United States Patent Office 3,284,608
Patented Nov. 8, 1966

3,284,608
CLEANER DEVICE FOR WELDING NOZZLE
Ralph C. McDonald, 228½ Short St., Troy, Ohio
Filed Sept. 29, 1965, Ser. No. 491,359
9 Claims. (Cl. 219—130)

This invention relates to welding nozzles and in particular to welding nozzles having cleaning means associated therewith.

In welding, particularly electric arc welding, the molten weld material will always spatter somewhat and many times fine droplets will get in the nozzle opening through which the wire forming the welding electrode is being fed. This spatter can build up and interfere with movement of the wire through the welding nozzle and can also interfere with the gas flow through the nozzle. Heretofore, it has been the practice to use a knife or some sort of cleaning tool to scrape out the droplets of spatter that build up inside the welding nozzle. Such a method of cleaning the nozzle is, at best, time consuming and troublesome and can cause damage to the welding nozzle and will, furthermore, tend to roughen the surface so that further droplets of spatter will adhere even more tightly to the welding nozzle.

With the foregoing in mind, a primary object of the present invention is the provision of a cleaning arrangement for a welding nozzle of the nature referred to in which the cleaning can be accomplished quickly and easily without any substantial loss of time and wherein no damage will occur to the welding nozzle.

Another object of this invention is the provision of a cleaning arrangement for a welding nozzle which is simple and inexpensive and which can be incorporated in substantially conventional nozzles without any substantial increase of bulk or weight thereof and at small cost.

These and other objects and advantages of the present invention become more apparent upon reference to the following specification taken in connection with the accompanying drawing in which:

FIGURE 1 is a view showing a welding nozzle partly in section,

FIGURE 2 is a view like FIGURE 1 but showing the welding nozzle adjusted into cleaning position and, FIGURE 3 is a view like FIGURE 1 but showing a modified construction.

Referring to the drawings somewhat more in detail, 10 indicates a substantially conventional flexible welding cable. On the end of the cable not shown there is a known mechanism for feeding a welding wire through the cable and for also supplying a blanketing gas therethrough if the weld is to be blanketed and, furthermore, cooling water can be supplied through the cable if so desired. The welding wire itself, indicated at 12 in the drawings is usually fed through a closely coiled wire guide 14 so that the flexibility of cable 10 is not interfered with while welding wire 12 is guided straight along the cable and through the nozzle.

Attached to the end of cable 10 illustrated is a welding nozzle generally indicated at 16 and which may comprise a body part 18 threaded to a suitable member on the end of the cable 10 or otherwise suitably attached thereto. Body 18 includes a sleeve portion 20 toward the outer end and projecting from the end of sleeve portion 20 is a nozzle member 22 through which welding wire 12 emerges when it its fed into a region to be welded. If the welding region is to be blanketed by gas, gas is fed through cable 10 via a passage 24 and flows through the nozzle and out through nozzle member 22 in surrounding relation to wire 12.

According to the present invention nozzle member 22 is reciprocable in sleeve member 20 against the bias of a compression spring 26. Also mounted in sleeve member 20 is a tubular element 28 having a flange 30 at one end while at the other end it is of such a diameter as substantially exactly to fit within opening 32 of nozzle member 22 while being provided with sharpened teeth means 34.

As will be seen in FIGURE 2, nozzle member 22 can be pushed backwardly inside sleeve 20 against the bias of spring 26 and cause the cleaning tube 28 to project through the opening in the nozzle member and in so doing to strip out from the opening in nozzle member 22 any spatter or other accumulation of soil. The cleaning operation can be carried out quickly merely by pushing the nozzle member inwardly into tube 20 so that substantially no time is lost from the work operation.

The spring 26 at one time serves to hold tube 28 in position in the nozzle structure and to hold nozzle member 22 in extended position.

In FIGURE 3 the wire guide 14a is extended outwardly into a free space 36 and is there connected to the tubular cleaning member 38 which corresponds in every respect to cleaning member 28 of FIGURES 1 and 2 except, instead of being flanged at the end opposite nozzle member 22, the cleaning tube is crimped inwardly as at 40 and thus is supported on the end of the guide 14a.

If gas is to be introduced through the arrangement of FIGURE 3, it can be conveyed from the passage 24 leading from flexible cable 10 via passage means 42 and the nozzle body member 44 into the aforementioned free space 36 when the gas can flow through openings 44 in tube 38 and then along with said tube and through nozzle member 22 and out the end thereof in surrounding relation to wire 12.

It will be seen that both modifications illustrated are quite inexpensive and are simple to construct and that the cleaning of the nozzle can be carried out very quickly and with no loss of time.

What I claim is:
1. In a welding nozzle; a body having an axial bore therethrough, a nozzle member reciprocally carried by said body and projecting from one end of said body, an axial bore through said nozzle member coaxial with the bore in the body and including a reduced diameter portion at the outer end of the nozzle member which is remote from the said one end of the body, a spring acting between said body and said nozzle member urging said nozzle member axially away from said one end of said body to extended position while permitting movement of said nozzle member axially toward said one end of said body to retracted position, a cleaning sleeve element inside said nozzle member coaxial with said axial bores having one end engaging said one end of said body and extending therefrom toward said bore portion of said nozzle member, at least the other end of said sleeve element which is remote from said one end of said body having a diameter only slightly smaller than the diameter of said bore portion, said other end of said sleeve element being disposed inwardly from the outer end of said bore portion when said nozzle member is in extended position and passing through said bore portion and projecting from the outer end of said bore portion when said nozzle member is moved against the bias of said spring to retracted position whereby the said other end of said sleeve element will dislodge foreign material from said bore portion, the wire electrode being utilized passing through said axial bores and said sleeve element.

2. A welding nozzle according to claim 1 in which said other end of said sleeve element includes sharpened cutting edge means thereon.

3. In a welding nozzle; a body, a nozzle member mounted in one end of the body and having a bore therethrough through which a wire electrode can be passed, a cleaning sleeve element mounted in said body coaxially with the bore in said nozzle member and having an outside diameter only slightly smaller than the diameter of said bore, said wire electrode also passing through said sleeve element, the end of said sleeve element disposed toward said nozzle member having cutting edge means formed thereon, and means for reciprocating said nozzle member in said body to cause said sleeve element to pass through the said bore in said nozzle member and to dislodge foreign material therefrom, said body having a cavity in which said sleeve element is mounted and within which said nozzle member is reciprocable, and compression spring means in said cavity engaging said nozzle member and urging the same toward extended position in said body while permitting the said reciprocation of said nozzle member over said cleaning sleeve element.

4. In a welding nozzle; a body, a nozzle member mounted in one end of the body and having a bore therethrough through which a wire electrode can be passed, a cleaning sleeve element mounted in said body coaxially with the bore in said nozzle member and having an outside diameter only slightly smaller than the diameter of said bore, said wire electrode also passing through said sleeve element, the end of said sleeve element disposed toward said nozzle member having cutting edge means formed thereon, and means for reciprocating said nozzle member in said body to cause said sleeve element to pass through the said bore in said nozzle member and to dislodge foreign material therefrom, said body having a cavity in which said nozzle member is reciprocable and compression spring means in said cavity engaging said nozzle member and urging the same toward extended position in said body while permitting the said reciprocation of said nozzle member over said cleaning sleeve element, said cleaning sleeve element being outwardly flanged at the end thereof which is remote from said nozzle member, and said compression spring means bearing at the one end of the flanged out end of said sleeve element whereby the sleeve element is retained in position by the said compression spring means.

5. In combination; a welding cable through which a wire electrode is fed, a welding nozzle mounted on the end of said cable and comprising a body having a cylindrical cavity therein, a nozzle member having one end disposed in said cavity and extending from said body at the end thereof opposite said cable, said nozzle member having a bore therethrough through which the wire electrode fed to said cable passes, a cleaning sleeve element in said cavity coaxial with the bore in said nozzle member and having an outside diameter only slightly smaller than the diameter of said bore, spring means in said cavity bearing on the inner end of said nozzle member and urging it outwardly in said body but permitting reciprocation of said nozzle member in said cavity so that said cleaning sleeve element will pass through the bore in said nozzle member and remove foreign material such as weld spatter therefrom, and means for supporting said cleaning sleeve element in said cavity.

6. In combination; a welding cable through which a wire electrode is fed, a welding nozzle mounted on the end of said cable and comprising a body having a cylindrical cavity therein, a nozzle member having one end disposed in said cavity and extending from said body at the end thereof opposite said cable, said nozzle member having a bore therethrough through which the wire electrode fed to said cable passes, a cleaning sleeve element in said cavity coaxial with the bore in said nozzle member and having an outside diameter only slightly smaller than the diameter of said bore, spring means in said cavity bearing on the inner end of said nozzle member and urging it outwardly in said body but permitting reciprocation of said nozzle member in said cavity so that said cleaning sleeve element will pass through the bore in said nozzle member and remove foreign material such as weld spatter therefrom, and means for supporting said cleaning sleeve element in said cavity, said cable including a central coiled wire guide for the wire electrode, said wire guide extending from the cable into the cavity in said body, and said cleaning sleeve element having its end adjacent said guide crimped on the guide for effecting the said support of said cleaning sleeve element in said cavity.

7. In combination; a welding cable through which a wire electrode is fed, a welding nozzle mounted on the end of said cable and comprising a body having a cylindrical cavity therein, a nozzle member having one end disposed in said cavity and extending from said body at the end thereof opposite said cable, said nozzle member having a bore therethrough through which the wire electrode fed to said cable passes, a cleaning sleeve element in said cavity coaxial with the bore in said nozzle member and having an outside diameter only slightly smaller than the diameter of said bore, spring means in said cavity bearing on the inner end of said nozzle member and urging it outwardly in said body but permitting reciprocation of said nozzle member in said cavity so that said cleaning sleeve element will pass through the bore in said nozzle member and remove foreign material such as weld spatter therefrom, and means for supporting said cleaning sleeve element in said cavity, said cable including means for supplying gas therethrough to the welding nozzle, and means for passing the gas through the cavity in said body and to the bore in said nozzle member for blanketing the region being welded, said last mentioned means comprising means for supplying said gas through said cleaning sleeve element to the bore of the nozzle member.

8. In combination; a welding cable through which a wire electrode is fed, a welding nozzle mounted on the end of said cable and comprising a body having a cylindrical cavity therein, a nozzle member having one end disposed in said cavity and extending from said body at the end thereof opposite said cable, said nozzle member having a bore therethrough through which the wire electrode fed to said cable passes, a cleaning sleeve element in said cavity coaxial with the bore in said nozzle member and having an outside diameter only slightly smaller than the diameter of said bore, spring means in said cavity bearing on the inner end of said nozzle member and urging it outwardly in said body but permitting reciprocation of said nozzle member in said cavity so that said cleaning sleeve element will pass through the bore in said nozzle member and remove foreign material such as weld spatter therefrom, and means for supporting said cleaning sleeve element in said cavity, said cable including a central coiled wire guide for the wire electrode, said wire guide extending from the cable into the cavity in said body, and said cleaning sleeve element having its end adjacent said guide crimped on the guide for effecting the said support of said cleaning sleeve element in said cavity, means for supplying gas through said cable to the cavity in said body, and apertures in said sleeve element to permit the gas to flow into the sleeve element and then to the bore in said nozzle member.

9. In a welding nozzle; a body, a nozzle member mounted in one end of the body and having a bore therethrough through which a wire electrode can be passed, a cleaning sleeve element mounted in said body coaxially with the bore in said nozzle member and having an outside diameter only slightly smaller than the diameter of said bore, said wire electrode also passing through said sleeve element, the end of said sleeve element disposed toward said nozzle member having cutting edge means formed thereon, and means for reciprocating said nozzle member in said body to cause said sleeve element to pass through the said bore in said nozzle member and to dislodge foreign material therefrom, said sleeve element having the said end thereof with the cutting edge means disposed in the bore of said nozzle member when the nozzle member is in extended position in said body, said bore in the nozzle member including a portion at the outer end of the nozzle member which closely receives said sleeve element and a portion at the inner end of the nozzle member which loosely receives said sleeve element.

References Cited by the Examiner

UNITED STATES PATENTS

| | | | |
|---|---|---|---|
| 2,659,796 | 11/1953 | Anderson | 219—130 |
| 2,730,469 | 1/1956 | Harwedd | 15—104.16 X |
| 2,761,049 | 8/1956 | McElrath et al. | 219—130 |
| 2,833,913 | 5/1958 | Bernard | 219—130 |
| 3,103,576 | 9/1963 | Miller | 219—130 |

RICHARD M. WOOD, *Primary Examiner.*